US012700735B1

(12) United States Patent
Bi et al.

(10) Patent No.: US 12,700,735 B1
(45) Date of Patent: Aug. 4, 2026

(54) SYSTEM-LEVEL LOW VOLTAGE RIDE-THROUGH CONTROL FOR THE RENEWABLE POWER PLANT CONNECTING TO WEAK GRID

(71) Applicant: NORTH CHINA ELECTRIC POWER UNIVERSITY, Beijing (CN)

(72) Inventors: Tianshu Bi, Beijing (CN); Ke Jia, Beijing (CN); Yang Zhang, Beijing (CN); Hao Liu, Beijing (CN); Cheng Wang, Beijing (CN)

(73) Assignee: NORTH CHINA ELECTRIC POWER UNIVERSITY, Beijing (CN)

( * ) Notice: Subject to any disclaimer, the term of this patent is extended or adjusted under 35 U.S.C. 154(b) by 0 days.

(21) Appl. No.: 19/321,403

(22) Filed: Sep. 8, 2025

(51) Int. Cl.
| | |
|---|---|
| *H02J 3/16* | (2026.01) |
| *H02J 3/50* | (2006.01) |
| *H02J 103/30* | (2026.01) |
| *H02J 103/35* | (2026.01) |

(52) U.S. Cl.
CPC .................. *H02J 3/16* (2013.01); *H02J 3/50* (2013.01); *H02J 2103/30* (2026.01); *H02J 2103/35* (2026.01)

(58) Field of Classification Search
None
See application file for complete search history.

(56) References Cited

U.S. PATENT DOCUMENTS

| | | | |
|---|---|---|---|
| 2020/0021133 A1* | 1/2020 | Liu ........................... | H02J 3/12 |
| 2021/0126522 A1* | 4/2021 | Preindl ................. | H02M 3/158 |

* cited by examiner

*Primary Examiner* — Mohammad Ali
*Assistant Examiner* — Saad M Kabir
(74) *Attorney, Agent, or Firm* — HUNTON ANDREWS KURTH LLP

(57) ABSTRACT

According to an aspect of the present disclosure, a system-level low voltage ride-through (LVRT) control system for a renewable power plant (RPP) connecting to a weak grid is provided. The system includes a voltage boundary vector trajectory model that captures geometric relationships of system-side responses to determine voltage controllable boundaries. The system includes a discrete and clustering matrix-based calculation algorithm that computes optimal current commands within the constructed boundaries.

1 Claim, 8 Drawing Sheets

(a) Case 1    (b) Case 2

(a) Difference in computed controllable boundaries by two controls in Case 3

(b) Difference in computed controllable boundaries by two controls in Case 4

(a) The active and reactive sequence currents of the wind farm (b) Three phase voltage at 0.69kV, 35kV, and 220kV nodes (c) Amplitude of sequence voltages at PCC and system side (d) Three-phase currents of the wind farm (e) Active and reactive power of the wind farm

SYSTEM-LEVEL LOW VOLTAGE RIDE-THROUGH CONTROL FOR THE RENEWABLE POWER PLANT CONNECTING TO WEAK GRID

FIELD OF INVENTION

The present disclosure relates to power system control for renewable energy sources, and more particularly to a system-level low voltage ride-through control method for renewable power plants connected to weak grids that accounts for transformer connection effects and voltage distribution characteristics across multiple voltage levels.

BACKGROUND

In electrical power engineering, low-voltage ride-through (LVRT), is the capability of electric generators to stay connected in short periods of lower electric network voltage

SUMMARY

The present disclosure focuses on the LVRT control in large-scale renewable power plants (RPPs) connected to weak grids, where grids fail to offer adequate reactive power, resulting in voltage fluctuations and necessitating additional reactive support from RPPs. However, in weak grids, the impact of system-side responses on LVRT control-especially transformer connections (TCs), becomes increasingly significant. Existing researches overlook this factor as its negligible effects in strong grid scenarios. However, in weak grids, this oversight becomes critical, as it can lead to voltage overruns at certain voltage levels, posing risks to system safety. Given this, a system-level LVRT control is described, focusing on safety constraints from system-side responses. This disclosure introduces a novel voltage boundary vector trajectory model that captures the geometric relationships of the system-side response, allowing for a more accurate determination of voltage controllable boundaries. To compute optimal commands in the constructed boundaries, a discrete and clustering matrix-based calculation algorithm is described. Based on the hardware-in-loop experimental platform, comparisons are made with both the latest literature and widely adopted engineering practices. It is proven that voltage overruns can easily occur with the short circuit ratio (SCR) of less than 3, which can be up to 14%. This disclosure effectively solves this security problem and simultaneously increases reactive power support by at least 30% when the voltage sag is not below 0.3 p.u.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION

Figure 1:
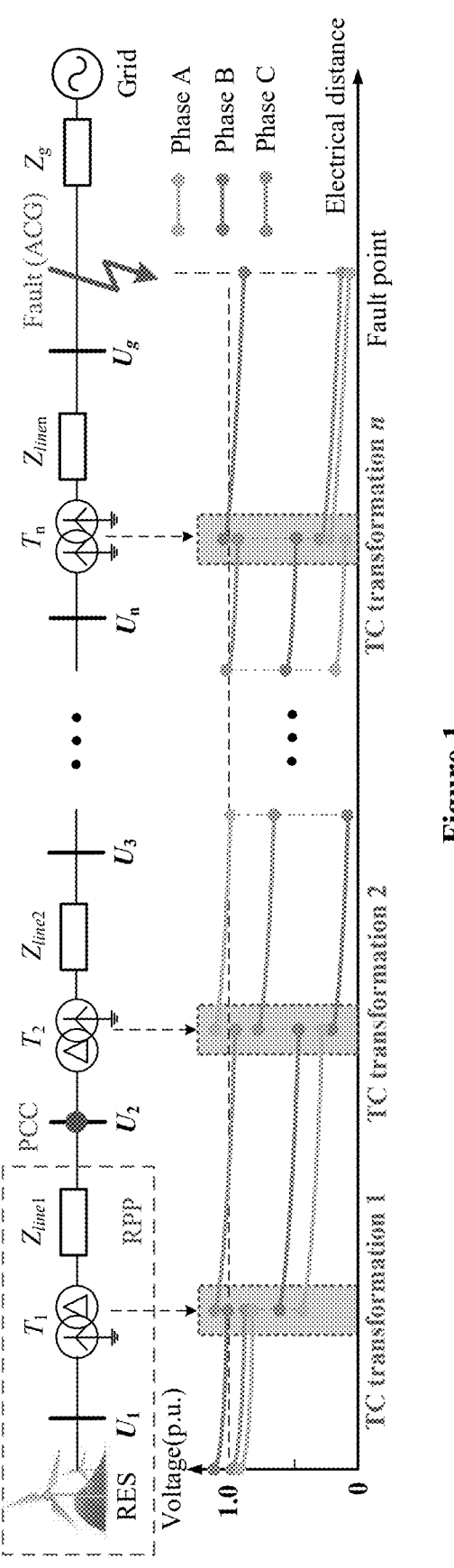
FIG. 1 shows a schematic diagram of asymmetrical phase voltage amplitude distribution in a general RPP grid-connected system (n≤4).

Exemplary embodiments of the invention will now be described in order to illustrate various features of the invention. The embodiments described herein are not intended to be limiting as to the scope of the invention, but rather are intended to provide examples of the components, use, and operation of the invention.

I. Introduction

The rapidly increasing inverter-interfaced RESs have remarkably altered the operating characteristics of modern power systems. Compared to conventional generators, short-circuit currents provided by inverters reduce from dozens of p.u. to merely 1-2 p.u., gradually resulting in power systems characterized by weak grid. Insufficient fault voltage support within weak grids can result in large-scale off-grid of RESs and even systemic safety issues, necessitating that RESs, especially integrated RPPs, be equipped with adequate reactive power support capacity. However, practical LVRT control methodologies often fail to meet reactive power requirements and ensure the security of weak grid. This inadequacy was evidenced by notable events in South Australia on Sep. 28, 2016, and Brazil on Aug. 15, 2023. Consequently, it is imperative to develop LVRT control tailored to the RPP connecting to the weak grid.

Over past two decades, various methodologies are developed to address the evolving challenges posed by increasingly stringent grid codes across different countries. Initial LVRT grid codes, such as those in Germany and the U.S., primarily focus on reactive power injection during symmetrical voltage sags. As grid codes evolved, particularly in the UK and Ireland, new approaches are developed to maximize reactive power injection. To address the limitations associated with asymmetrical conditions, hybrid sequence component injection techniques are later introduced, balancing the injection of positive and negative currents in proportion to voltage sags. These strategies, collectively known as single-objective control methodologies, have become widely adopted in the industry due to their linear and predictable response of RPP output to voltage sags at the PCC. However, in weak grids, these single-objective methodologies lack the necessary flexibility to adapt to diverse disturbances, leading to underutilization of reactive power capacity in weak grid scenarios.

To better harness the flexible and maximum voltage support capabilities of RPPs, recent years have seen a surge in research on multiple-objective control methodologies. Early works introduce dynamic injection ratios between sequence currents, marking one of the first instances of optimization thinking in LVRT control for RPPs. Several studies have since proposed generating dynamic current commands based on closed-loop control to achieve significant performance improvements. However, the slower response speed inherent to closed-loop control makes it difficult to meet the stringent requirements of modern grid codes. Subsequent researches focus on optimizing command generation, providing greater flexibility across various scenarios. Although initial optimal solutions without security constraints are derived, practical implementations must incorporate these constraints. Recent studies have integrated various security constraints into the LVRT control of RPPs, including active and reactive power oscillations limitations, peak current limitation, maximum DC bus voltage limitation, phase voltage limitation, and compliance with LVRT grid code voltage profiles. To address the multi-constraint optimization challenge, sub-scenario optimal LVRT command expressions are derived. Additionally, the concept of controllable boundaries is further described to enhance the flexibility of LVRT control while minimizing computational costs and meeting support requirements under different conditions.

Despite these advancements, there remains a lack of comprehensive exploration of safety constraints in the LVRT control process, particularly concerning voltage security from a system-level perspective. Unlike synchronous generators, RPP functions as a current source during LVRT events and therefore lacks direct voltage control capabilities of the system. In strong grid scenarios, the influence of system-side responses on LVRT control is negligible. While in weak grid scenarios, the reduced grid strength enhances the fault voltage regulation capability of RPPs, rendering the system-side response a critical factor to constraint LVRT control process, especially concerning TCs. Existing studies adopt a limited perspective inside the single RES, potentially posing significant security risks of voltage overruns within the system.

To address the issue, a system-level LVRT control of the RPP is described to focus on ensuring system voltage safety. This disclosure is summarized as follows:

Mechanism analysis of the LVRT controllable boundary of RPP affected by system response, revealing the inadequacy of existing theories.

Development of novel voltage controllable boundaries that capture geometric relationships within the system, allowing for a more accurate determination of system-side responses.

Description of a control algorithm based on the discrete and clustering matrix, enabling fast calculation of the optimal RPP commands under various scenarios.

The remaining sections are organized as follows: Section II delves into the impact of system voltage distribution on the LVRT control of the RPP. Section III outlines the establishment of LVRT controllable boundaries and proposes the novel LVRT control methodology of the RPP.

The hardware-in-loop tests are shown in Section IV, and conclusions are drawn in Section V.

II. Influence of System Voltage Distribution Characteristics on the LVRT Controllable Boundaries of the RPP A. Overview of Safety Constraints to be Considered for RPP Reactive Power Control In an integrated RPP grid-connected system, there are usually 2~4 voltage levels from the renewable energy unit to the high-voltage system. To establish a generalized analyzing theory for the LVRT control, an RPP grid-connected system with an n-stage step-up is presented in FIG. 1, where the subscript "i" (i=1 . . . n) denotes the i-th node. Considering various demands such as third harmonic filtering and isolation of zero sequence paths, transformer connections may vary, including over a dozen configurations like Yd1, Dyn11, YNy4.

FIG. 1 shows a schematic diagram of asymmetrical phase voltage amplitude distribution in a general RPP grid-connected system (n≤4).

During asymmetrical voltage sags, the RPP control system collects the voltage and current at PCC and decomposes them into positive and negative sequence components. Based on the measured information, the LVRT module calculates the active and reactive current commands.

With reference to the phase of control coordinate system, the voltage and output current components of RPP at PCC can be expressed as follows.

$$U_{PCC} = \begin{bmatrix} V_{PCC}^+\cos(\omega t + \delta_{PCC}^+) + V_{PCC}^-\cos(\omega t + \delta_{PCC}^-) \\ V_{PCC}^+\sin(\omega t + \delta_{PCC}^+) - V_{PCC}^-\sin(\omega t + \delta_{PCC}^-) \end{bmatrix} \quad (1)$$

$$I_{PCC} = \begin{bmatrix} I_P^+\cos(\omega t + \delta_{PCC}^+) - I_Q^+\sin(\omega t + \delta_{PCC}^+) \\ I_P^+\sin(\omega t + \delta_{PCC}^+) + I_Q^+\cos(\omega t + \delta_{PCC}^+) \end{bmatrix} + $$
$$\begin{bmatrix} I_P^-\cos(-\omega t - \delta_{PCC}^-) - I_Q^-\sin(-\omega t - \delta_{PCC}^-) \\ I_P^-\sin(-\omega t - \delta_{PCC}^-) + I_Q^-\cos(-\omega t - \delta_{PCC}^-) \end{bmatrix} \quad (2)$$

The relationship between RPP output and the voltage at the i-th node in the system can be expressed as follows.

$$V_i^+ = X_{\Sigma i-n}I_Q^+ + \sqrt{V_g^{+2} - (X_{\Sigma i-n}I_P^+)^2} \quad (3)$$

$$V_i^- = -X_{\Sigma i-n}I_Q^- + \sqrt{V_g^{-2} - (X_{\Sigma i-n}I_P^-)^2}$$

$$\gamma_i = \gamma_g + \arcsin\frac{X_{\Sigma i-n}I_P^+}{V_g^+} + \arcsin\frac{X_{\Sigma i-n}I_P^-}{V_g^-}, i = 1 \ldots n$$

The amplitude of phase voltage at i-th node is listed as follow.

$$V_{i,\varphi} = \sqrt{V_i^{+2} + V_i^2 + 2V_i^+ V_i^-\cos(\gamma_i + \varphi)} \quad (4)$$

According to (1)-(4), three safety constraints to be reckoned for LVRT control can be summarized. In (3) and (4), weak grid has the large equivalent impedance and the RPP output current significantly changes the system voltage. Therefore, the LVRT control of RPP should avoid the phase voltage overruns at any voltage level. In addition, the amplitude of phase current and active power oscillation must be controlled for the protection of RES converters and DC bus capacitors.

However, as a current source, RPP cannot directly control the voltage during LVRT control, and thus is affected by the voltage distribution on the system side. Existing research perspectives are limited to the PCC point of a single converter, which is not able to ensure the voltage safety of the whole system during LVRT control. Later sections analyze the characteristics of system voltage distributions and its influence on LVRT controllable boundaries of the RPP.

B. Mechanism Analysis of System-Side Response Affecting the LVRT Controllable Boundaries of the RPP The LVRT controllable boundaries are mainly influenced by the sophisticated voltage distributions in the high-voltage system. During asymmetrical voltage sags, different types of TC transformation will reshape the phase voltage amplitudes at different voltage levels. When asymmetrical voltage propagates from one node to the other, the TC transformation leads to a phase jump of the positive and negative sequence voltages.

$$V_{i+1}^+ = V_i^+ \angle \alpha, \quad V_{i+1}^- = V_i^- \angle(-\alpha) \tag{5}$$

where $\alpha \in [0, 2\pi]$ depends on the type of TC and is a multiple of 30°, e.g. the type YNd11 corresponds to $\alpha=30°$.

Generally, the effect of active current components on voltage magnitude is negligible, and voltage phases in (3) change small enough to the linearization of trigonometric functions. Then substituting (5) into (3), (4) at the i-th and the j-th nodes yields the equation as follows.

$$V_{i,\varphi} = \sqrt{V_i^{+2} + V_i^2 + 2V_i^+ V_i^- \cos(\gamma_i + \varphi)} \tag{6-1}$$

$$V_{j,\varphi} = \sqrt{\begin{array}{c} \left(V_i^+ + X_{\Sigma,i-j}I_Q^+\right)^2 + \left(V_i^- - X_{\Sigma,i-j}I_Q^-\right)^2 + \\ 2\left(V_i^+ + X_{\Sigma,i-j}I_Q^+\right)\left(V_i^- - X_{\Sigma,i-j}I_Q^-\right) \\ \cos[\gamma_i + \varphi + 2\alpha_{\Sigma,i-j}] \end{array}} \tag{6-2}$$

To compare the voltage amplitudes at two sides of the TC, subtracting the two equations in (6-1) and (6-2), the difference is shown as follows.

$$\Delta V_{i-j,\varphi} = V_{i,\varphi} - V_{j,\varphi} \tag{7}$$

To understand the influence of transformer connection (TC) transformations, we need to determine the sign of the voltage difference $\Delta V_{i-j,\varphi}$ that is, whether $\Delta V_{i-j,\varphi}>0$ or $\Delta V_{i-j,\varphi}<0$. We consider the limiting case where the voltage difference between the two sides is maximized, which corresponds to the maximum value of $V_{j,\varphi}$. From the form of equation (6-2), we deduce that this limiting case occurs when the positive-sequence reactive current $I_Q^+$ equals 1 p.u., and the negative-sequence reactive current $I_Q^-$ equals 0 p.u., as shown in (8).

$$V_{j,\varphi,max} = \sqrt{\begin{array}{c} \left(V_i^+ + X_{\Sigma,i-j}I_Q^+\right)^2 + V_i^{-2} + \\ 2(V_i^+ + X_{\Sigma,i-j})V_i^- \cos[\gamma_i + \varphi + 2\alpha_{\Sigma,i-j}] \end{array}} \tag{8}$$

In this way, (7) can be expressed in the limit case by substituting (6-1) and (8).

$$\Delta V_{i-j,\varphi} = \cfrac{X_{\Sigma,i-j}^2 + 2\{V_i^+ + V_i^- \cos[\gamma_i + 2\alpha_{\Sigma,i-j}]\}X_{\Sigma,i-j} - }{\sqrt{\begin{array}{c}(V_i^+ + X_{\Sigma,i-j})^2 + V_i^{-2} + \\ 2(V_i^+ + X_{\Sigma,i-j})V_i^- \cos[\gamma_i + 2(i-j)\alpha]\end{array}} + } \cfrac{4V_i^+ V_i^- \sin[\gamma_i + \alpha_{\Sigma,i-j}]\sin[\alpha_{\Sigma,i-j}]}{} + \sqrt{V_i^{+2} + V_i^{-2} + 2V_i^+ V_i^- \cos\gamma_i} \tag{9}$$

However, when $X_{\Sigma,i-j}$ is larger enough, $\Delta V_{i-j,\varphi}$ is constantly less than 0 regardless of the value of any other variable in (6). There exists a critical value for $X_{\Sigma,i-j}$ that the voltage distribution is absolutely monotonical, and can be solved by constructing an inequality about (9), written as follows.

$$X_{CR} \geq \sqrt{C^2 + 4V_i^+ V_i^- \sin(\gamma_i + \alpha_{\Sigma,i-j})\sin\alpha} - C \tag{10}$$

$$C = (V_i^+ + V_i^- \cos(\gamma_i + 2\alpha_{\Sigma,i-j}))$$

The critical impedance is a function of $V_i^+$, $V_i^-$, $\gamma_i$ and $\alpha$. Traversing all the independent variables calculates that $X_{CR}$ in (10) is larger than 1.73 p.u., which is much larger than the impedance in a practical transformer (0~0.2 p.u.). Therefore, when analyzing the effect of TC transformation on asymmetric voltage distribution, the influence of $X_{\Sigma,i-j}$ can be ignored, thus making a simplification of (9) can get the equation as follows.

$$\Delta V_{i-j,\varphi} = \cfrac{-2A\sin(\gamma_i + \varphi + \alpha_{\Sigma,i-j})\sin(\alpha_{\Sigma,i-j})}{\sqrt{A_i\cos(\gamma + \varphi + 2\alpha_{\Sigma,i-j}) + B} + \sqrt{A\cos(\gamma + \varphi) + B}} \tag{11}$$

$$A = 2V^+V, \quad B = V^{+2} + V^{-2}$$

Since the values of $\alpha$, $\gamma$, and $\varphi$ are all in the range of 0 to $2\pi$, the $\Delta V_{i-j,\varphi}$ in (11) is always not constantly positive or constantly negative under any condition. Especially, after substituting the $\varphi$ of three-phase voltages into (11), the asymmetrical phase voltage amplitude from the i-th node to the j-th node is always increased in at least one phase while decreased in at least another phase, as the example shown in FIG. 2.

Figure 2:
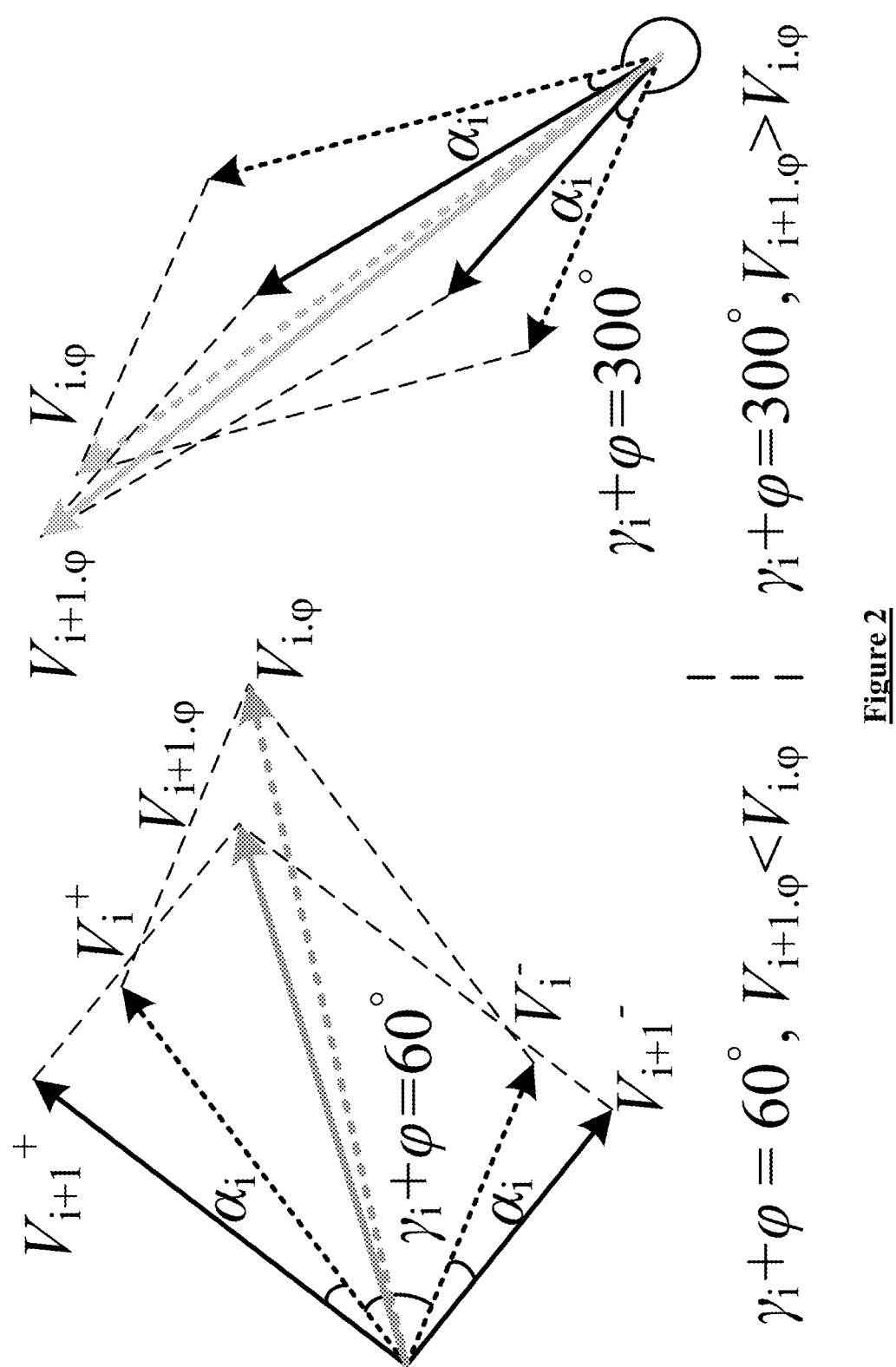
FIG. 2 shows two exemplary cases of the TC transformation in different phases.

FIG. 2 shows two exemplary cases of the TC transformation in different phases.

Based on (11), we have demonstrated that the distribution of asymmetrical phase voltage amplitudes across the system is discontinuous and non-monotonic, as illustrated in FIG. 1. This means that if the RPP increases its output current without appropriate control measures, it can lead to voltage overruns at certain voltage levels, even when the voltage at the PCC remains within safe limits. Typically, the RPP controller can only monitor voltages at PCC and lacks the capability to detect voltage overruns occurring at other nodes in the system. The sophisticated voltage distribution patterns make it challenging for RPP controllers to ensure voltage safety across the entire system during LVRT, especially in weak grid conditions.

III. System-Level LVRT Control of the RPP

For the control security caused by TC transformations in the LVRT process of the RPP, a novel boundary equation is constructed and a more complete LVRT control methodology of RPP is proposed.

A. LVRT Controllable Boundaries of The RPP

Generally, inverter-interfaced RESs behave as current sources during LVRT. Therefore, the controllable boundaries of the RPP are constructed based on the variables of positive and negative reactive currents.

a) Voltage Controllable Boundary

Conventional studies are insufficient to construct the voltage boundaries by (4) due to the TC transformations.

Figure 3:
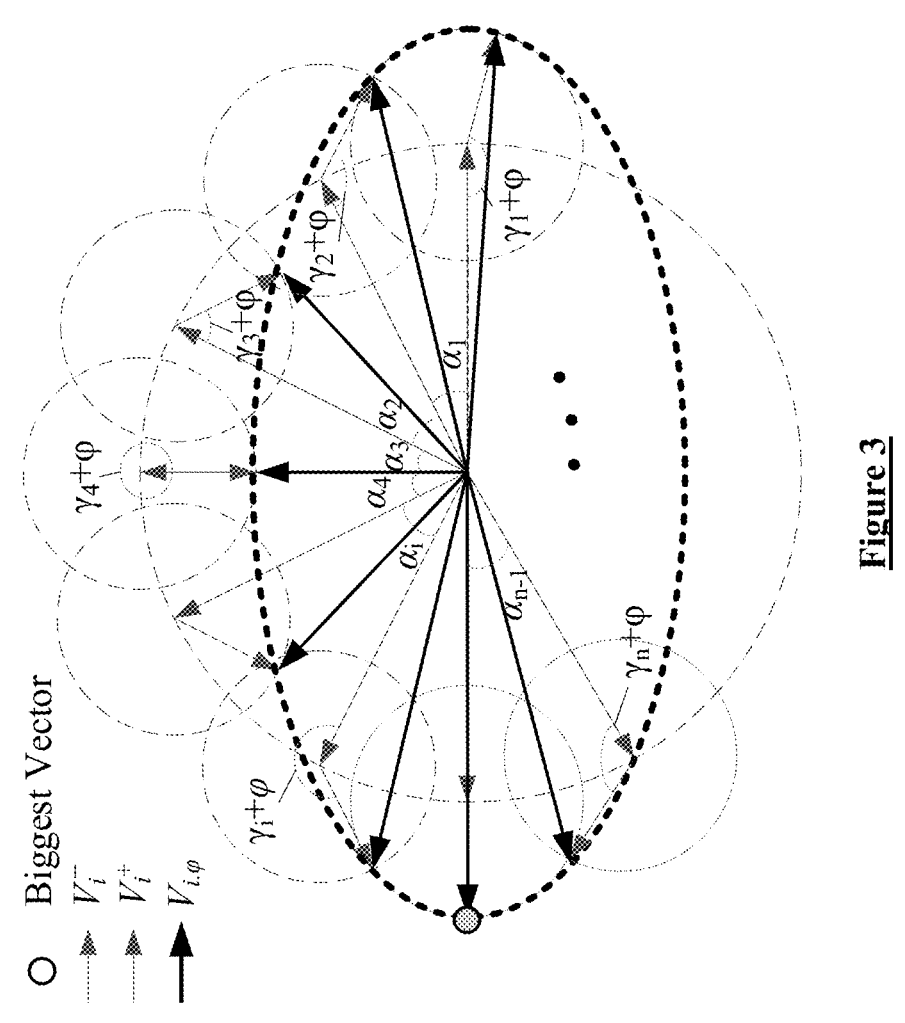
FIG. 3 shows exemplary vector trajectory of RPP voltage controllable boundary on n-nodes under different $\gamma$ and $\alpha$.

According to (11), the trajectory of voltage boundary vector that accounts for TC transformations is illustrated in FIG. 3.

FIG. 3 shows exemplary vector trajectory of RPP voltage controllable boundary on n-nodes under different $\gamma$ and $\alpha$. In FIG. 3, the mutation angle of $\alpha$ is always the multiple of 30°, regardless of the type of TC transformations. Therefore, with reference to the phase of RPP control coordinate system, the voltage controllable boundary considering TC transformations can be inscribed by selecting six amplitude-equal voltage vectors spaced 60° apart, as shown in (12).

$$V_{lim}^2 = \left(X_\Sigma I_Q^+ + A_u\right)^2 + \left(-X_\Sigma I_Q^- + V_g^-\right)^2 + \tag{12}$$
$$2\left(X_\Sigma I_Q^+ + A_u\right)\left(-X_\Sigma I_Q^- + V_g^-\right)\cos\left(\gamma_{PCC} + \Delta\gamma - \frac{k\pi}{3}\right)$$
$$A_U = \sqrt{V_g^{+2} - (X_\Sigma I_P^+)^2}, \ \Delta\gamma = X_\Sigma\left(I_P^+ - I_{P,|0|}^+\right)/V_g^+$$
$$k = 0, 1, 2, 3, 4, 5$$

The $X_\Sigma$, $V_g^+$ and $V_g^-$ can be measured by the online impedance estimator and is a mature technology. Furthermore, the voltage phase difference inside the RPP should also be factored. Since the low-voltage collecting lines have a higher R/X ratio, and RES units are connected serially, the voltage phase difference may vary by tens of degrees between the different RES units, caused by output reactive power. Thus, the voltage boundary vector may appear at any point on the ellipse, as presented in FIG. 3. And the longest axis vector of the ellipse represents the maximum vector under different conditions, providing the most reasonable boundary. According to (12) and FIG. 3, the voltage controllable boundary equation in the proposed LVRT control methodology can be expressed as $$V_{lim}^2 = \left(X_\Sigma I_Q^+ + A_U\right)^2 + \left(-X_\Sigma I_Q^- + V_g^-\right)^2 + 2\left(X_\Sigma I_Q^+ + A_U\right)\left(-X_\Sigma I_Q^- + V_g^-\right) \tag{13}$$

b) Other Controllable Boundaries

According to the instantaneous power theory and equations (1) and (2), the active power oscillation controllable boundary can be expressed as follows.

$$\frac{4}{9}P_{lim}^\theta = \tag{14}$$
$$\left[\left(V_g^- - X_\Sigma I_Q^-\right)I_P^+\right]^2 + \left[\left(X_\Sigma I_Q^+ + \sqrt{V_g^{+2} - (X_\Sigma I_P^+)^2}\right)I_Q^- - \left(V_g^- - X_\Sigma I_Q^-\right)I_Q^+\right]^2$$

The phase current boundary can be calculated as follows.

$$I_{lim}^2 = I_{\alpha1}^2 + I_{\alpha2}^2 \tag{15-1}$$

$$I_{lim.m}^2 = \left[\left(\sqrt{3}\,I_{\beta1} - I_{\alpha1}\right)^2 + \left(\sqrt{3}\,I_{\beta2} - I_{\alpha2}\right)^2\right]/4 \tag{15-2}$$

$$I_{lim.m}^2 = \left[\left(\sqrt{3}\,I_{\beta1} + I_{\alpha1}\right)^2 + \left(\sqrt{3}\,I_{\beta2} + I_{\alpha2}\right)^2\right]/4 \tag{15-3}$$

$$\begin{cases} I_{\alpha1} = I_P^+ + I_Q^-\sin\gamma_{PCC}, \ I_{\alpha2} = I_Q^+ - I_Q^-\cos\gamma_{PCC} \\ I_{\beta1} = -I_Q^+ - I_Q^-\cos\gamma_{PCC}, \ I_{\beta2} = I_P^+ - I_Q^-\sin\gamma_{PCC} \end{cases} \tag{15-4}$$

B. LVRT Control Algorithm of The RPP

Figure 4:
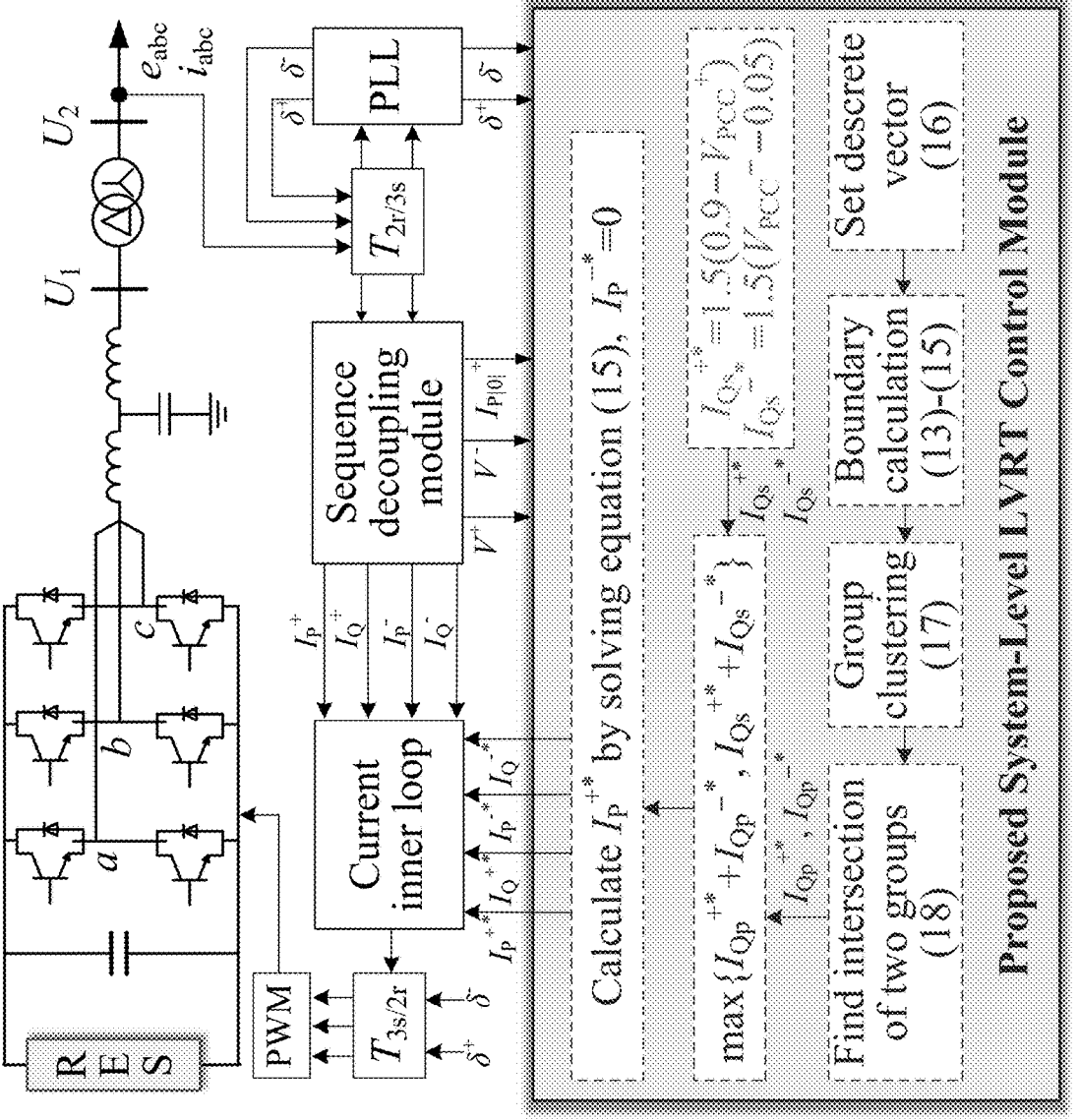
FIG. 4 shows exemplary LVRT control system block diagrams of the RPP.

FIG. 4 shows exemplary LVRT control system block diagrams of the RPP. To find the optimal current commands in the constructed LVRT controllable region of the RPP, boundary equations are discretized and grouped via a matrix. The resulting matrix will be computed in parallel in the processor and the optimal current commands will be obtained by comparing the magnitudes. The block diagram of the entire control system is shown in FIG. 4, in which the classical positive and negative sequence separation module and the current-inner-loop module are adopted. The conventional LVRT control module is replaced by the proposed one, which is indicated by the blue block in FIG. 4. During the asymmetrical voltage sags, the control objective prioritizes the positive reactive power, then uses the remaining capacity for the negative reactive power, and finally for the active power.

Firstly, discretizing the $I_Q^+$ to m-dimensional vector $I_{Q.des}^+$.

$$I_{Q.des}^+ = \left[0 : \sqrt{I_{lim}^2 - I_P^{+2}} \big/ m : \sqrt{I_{lim}^2 - I_P^{+2}}\right] \tag{16}$$

where m denotes discrete resolution and is taken as 50-100.

Substitute $I_{Q.des}^+$ into equations (13)-(15), which can solve for ten vectors (two solutions solved from each equation) about $$I_Q^-.$$

These vectors are further grouped into two matrixes according to the norm of each solution vector. Vectors with a larger norm are clustered and combined to $B_{up}$ while the smaller one is combined to $B_{down}$.

$$\begin{cases} B_{up} = \begin{bmatrix} I_{Q.des\,1.1.1}^- & L & I_{Q.des\,1.1.k}^- \\ M & O & M \\ I_{Q.des\,1.m.1}^- & L & I_{Q.des\,1.m.k}^- \end{bmatrix} \\ B_{down} = \begin{bmatrix} I_{Q.des\,2.1.1}^- & L & I_{Q.des\,2.1.k}^- \\ M & O & M \\ I_{Q.des\,2.m.1}^- & L & I_{Q.des\,2.m.k}^- \end{bmatrix} \end{cases} \tag{17}$$

where $$I_{Q.des1.m.k}^-$$

and $$I_{Q.des2.m.k}^-$$

denote the two solutions obtained from the k-th equation at the m-th discrete point.

Calculate the maximum value of each row of the $B_{up}$ and the minimum value of each row of the $B_{down}$ and combine them into $I_{up}$ and $I_{down}$ respectively. Compare the elements in $I_{up}$ and $I_{down}$ and find the value when (18) is satisfied.

$$I_{up.i} \leq I_{down.i} \tag{18}$$

Then $I_{up.i}$ is chosen as the negative reactive current command of the RPP, and the positive reactive current command is set as the i-th element in (16). Then put the calculated reactive current command into (15), and the minimum values from these solutions are chosen as the positive sequence active current command for RPP. Finally, the negative sequence active current command of the RPP is 0. Notably, this algorithm can also fit other control objectives, such as prioritizing negative reactive power or ensuring the maximum sum of reactive current. The adjustment of control objectives only requires a tiny modification in (18) in the same principle.

After the RPP controller calculates the actual optimal current command (in unit value form), these commands (containing the positive and negative active and reactive current components) will be issued to all units within the RPP, whether they are wind turbines, photovoltaics, or static var generators (SVGs). After receiving these commands, their grid-connected inverter mathematically transforms the optimal current command values to obtain the switching signal of the thyristor, and then controls the output three-phase current. Through the above process, the present invention achieves output control of each unit within the RPP. Under the control of the present invention, each unit will allocate all its controllable resources to increase positive and negative sequence reactive power within the allowable safety limits, thereby raising the voltage of the system during disturbances. In weak power grid scenarios, this voltage rise will significantly enhance the stability margin of the system, to some extent avoiding cascading tripping events.

IV. Hardware-in-loop Experimental Verification

To validate the performance of the proposed control, a hardware-in-loop experiment is conducted, in which the closed-loop platform contains a RTDS and a digital controller. The experimental platform models a practical wind farm connected to a weak power grid in Xinjiang, China, featuring the short-circuit ratio (SCR) of 3 and the rated capacity of 247.5MW. The topology and control methodology of the system is built as FIG. 1 and FIG. 4. The system includes three voltage levels, 0.69 kV, 35 kV, and 220 kV, with TCs in Dyn11 and YNd11 configurations, respectively. The phase-locked loop (PLL) adopted in the controller is the notch filter-based PLL, one of the PLL forms that is used in a wide range of engineering applications and perform well in different fault conditions.

The RPP controller is implemented on the Xilinx Zynq 7000 board, where the control loops and the proposed LVRT control are both constructed according to FIG. 4. The RTDS simulates the circuit model of the RPP connecting to the grid. The hardware controller samples PCC voltages and currents data from the RTDS, generating modulated wave signals that are fed back to the RTDS. Modulated signals are fed into the PWM in the RTDS to control power electronic switches. Data transmission occurs by the optical fiber through the Aurora protocol at a communication frequency of 20 kHz, which simulates the optical fiber-based IEC 104 communication applied in the real wind farm. Parameters of the system and controller are detailed in Table A1 in the Appendix.

The control limits are set at 1.1 p.u. for phase voltage amplitude, 1.2 p.u. for phase current amplitude, and 0.4 p.u. for active power oscillation amplitude.

A. Two Cases of Phase Voltage Overruns with Inappropriate Control of Reactive Power To demonstrate that the LVRT control methodology of RPP is affected by TC transformations, two cases of local phase voltage overrun are given due to the improper control of the wind farm. The test conditions of two cases are set as Table I. The BG fault occurs in case 1 while the ABG fault occurs in case 2. The maximum amplitude of the output phase currents in two cases all does not exceed the safe threshold. Waveforms of three-phase voltages at the 0.69 kV, 35 kV and 220 kV in Case 1 and Case 2 are shown in FIG. 5 (a), (b) respectively.

TABLE I

| TEST CONDITIONS SETTING IN TWO CASES | | | | | | | |
|---|---|---|---|---|---|---|---|
| | Parameter Settings for the Case1 and Case2 (p.u.) | | | | | | |
| Test Cases | Vga | Vgb | Vgc | $I_P^+$ | $I_Q^+$ | $I_P^-$ | $I_Q^-$ |
| Case 1 | 1.0 | 0.0 | 1.0 | 0.10 | 0.63 | 0.00 | 0.15 |
| Case 2 | 0.0 | 0.0 | 1.0 | 0.05 | 1.05 | 0.00 | 0.11 |

Figure 5:
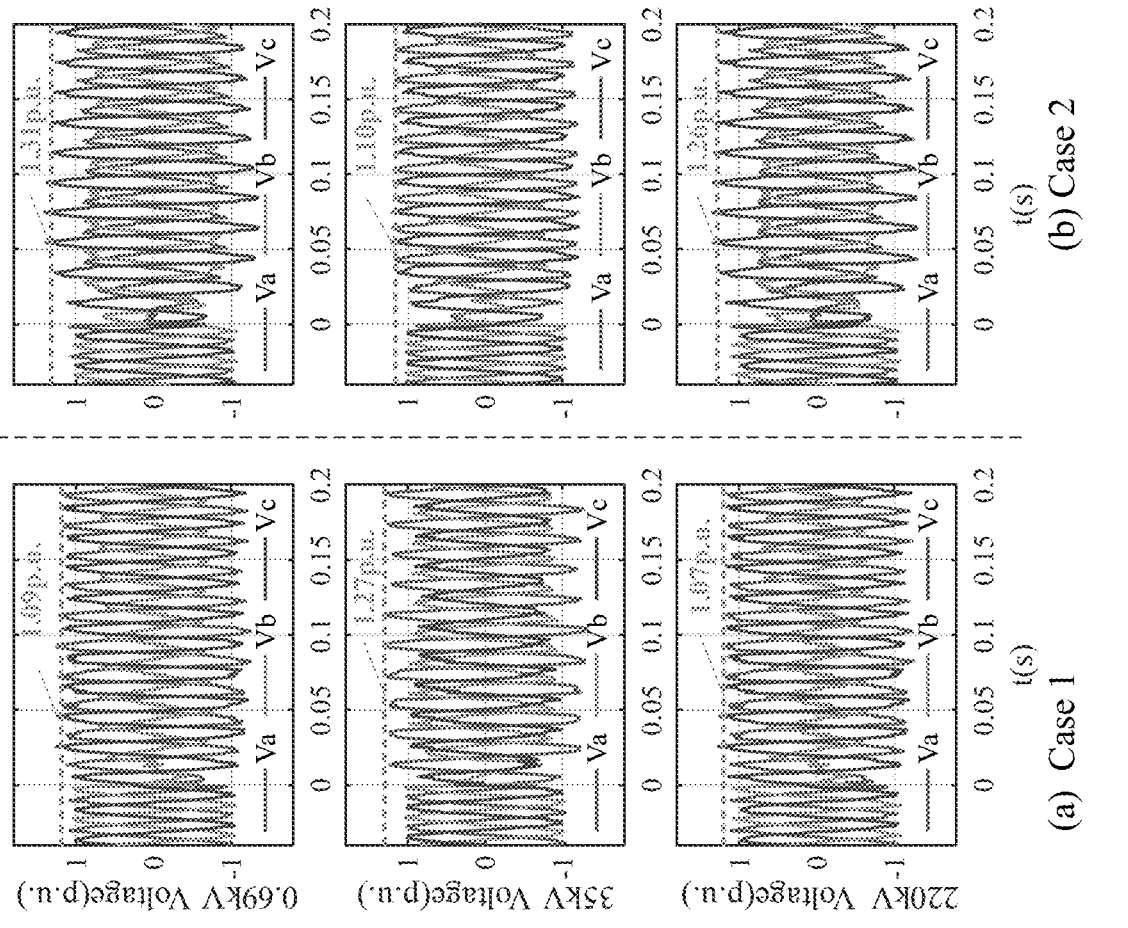
FIG. 5 shows two exemplary cases of local voltage overrun, one with a Phase A overruns on 35 kV node, and another with a Phase C overruns on 0.69 kV and 220 kV nodes.

FIG. 5 shows two exemplary cases of local voltage overrun, one with a Phase A overruns on 35 kV node, and another with a Phase C overruns on 0.69 kV and 220 kV nodes. It is concluded that phase voltage amplitudes on different voltage levels are evidently reshaped due to TC transformations. As depicted in FIG. 5(a), in Case 1, three-phase voltages at 0.69 kV and 220 kV behave like a BG fault characteristic without voltage overruns, whereas at 35 kV, the voltage is characterized by BC-phase voltage dropping and an A-phase overrun reaching 1.27 p.u. Conversely, in Case 2, as shown in FIG. 5(b), three-phase voltages at 35 kV behave like a BG fault pattern without overruns, yet overruns are observed at both 0.69 kV and 220 kV, with the maximum values reaching 1.31 p.u. and 1.26 p.u., respectively. The RPP controller collects 35 kV voltage data solely at the PCC and cannot ensure the voltage safety of all voltage levels in the system. Increasing reactive power without considering TC transformations jeopardizes the voltage security at other nodes. Consequently, it is crucial to investigate the impact of TC transformations on the LVRT control of the RPP.

B. The Security Enhancement Compared With Latest Researches

To demonstrate the security enhancement of the proposed control, we compare it with findings presented in latest studies. Two test conditions are set as: a) case3, $V_{ga}$=0 p.u., $V_{gb}$=0.5 p.u. and $V_{gc}$=1 p.u., b) case4, $V_{ga}$=1 p.u., $V_{gb}$=0.5 p.u. and $V_{gc}$=0.5 p.u. To illustrate the shortcomings of existing researches and the innovation of the proposed control methodology, the LVRT controllable boundaries computed by two approaches in two cases are first depicted in FIG. 6. Table II further shows the performance comparison of two approaches.

Figure 6:
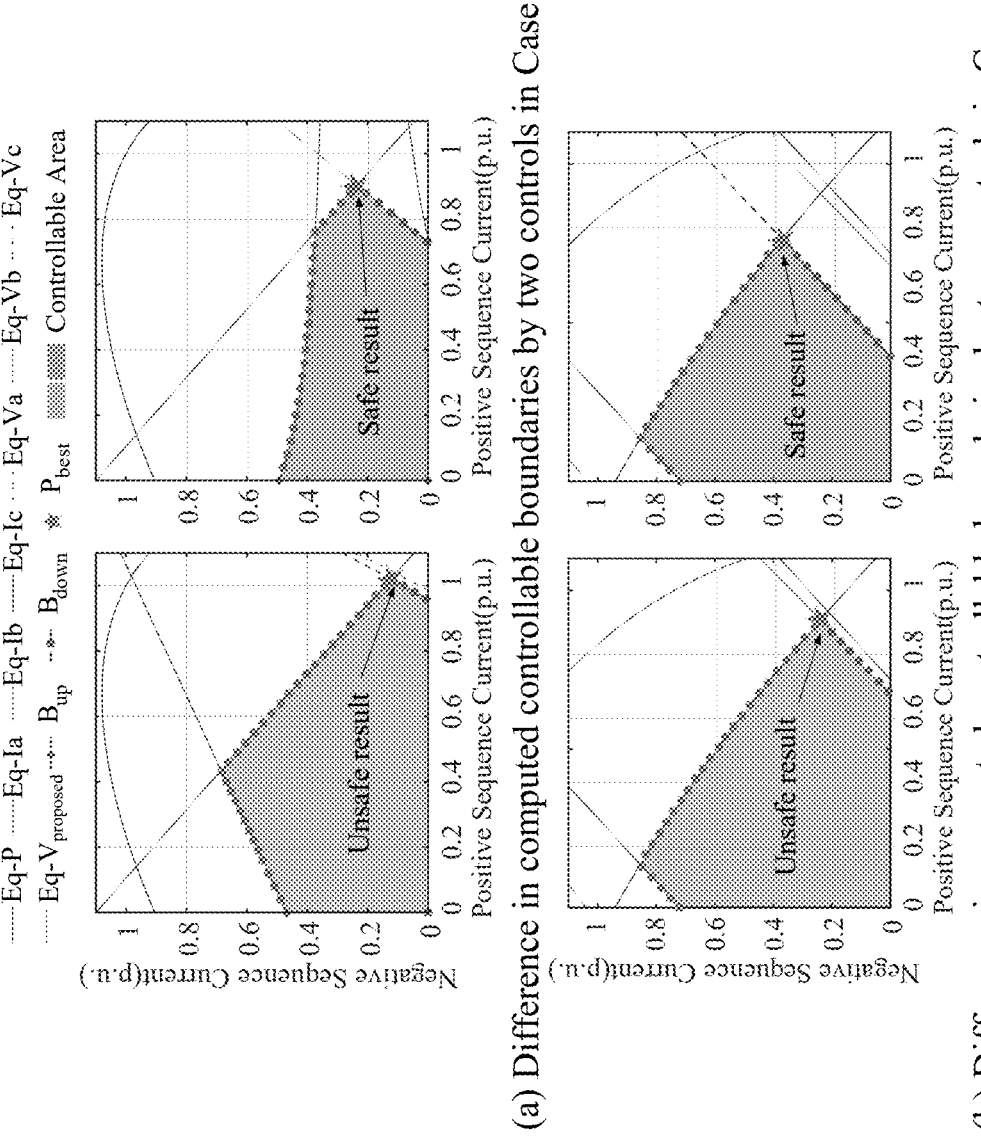
FIG. 6 shows exemplary difference of LVRT controllable boundary between the existing control with an exemplary control in Case 3 and Case 4.

FIG. 6 shows exemplary difference of LVRT controllable boundary between the existing control with an exemplary control in Case 3 and Case 4.

TABLE II

PERFORMANCE COMPARISON BETWEEN EXISTING
CONTROL IN [34]-[35] AND THE PROPOSED CONTROL

| Test cases | Index | | [34]-[35] | Proposed Control |
|---|---|---|---|---|
| Case3 | Max-amplitude phase voltage of nodes | 0.69 kV | 1.22 p.u. | 1.10 p.u. |
| | | 35 kV | 1.05 p.u. | 0.98 p.u. |
| | | 220 kV | 1.17 p.u. | 1.02 p.u. |
| | Max-amplitude of phase current | | 1.16 p.u. | 1.18 p.u. |
| | Active power oscillation | | 0.34 p.u. | 0.36 p.u. |
| Case4 | Max-amplitude phase voltage of nodes | 0.69 kV | 1.25 p.u. | 1.07 p.u. |
| | | 35 kV | 1.01 p.u. | 0.97 p.u. |
| | | 220 kV | 1.18 p.u. | 1.04 p.u. |
| | Max-amplitude of phase current | | 1.19 p.u. | 1.19 p.u. |
| | Active power oscillation | | 0.28 p.u. | 0.33 p.u. |

As observed from FIGS. 6(a) and (b), the controllable area of the wind farm computed by existing controls is larger than that of the described control, owing to the neglection of system responses. As a result of such deficiency, existing control methodologies over-exploit the reactive power support capability of the RPP, resulting in voltage overruns at the 0.69 kV and 220 kV nodes, as shown in Table II. In Case 3, the max-amplitude of phase voltages at 0.69 kV and 220 kV reach 1.22 p.u. 1.17 p.u., while that reach 1.25 p.u. and 1.18 p.u. in Case 4. In contrast, the proposed control fully incorporates constraints from system response and obtains a more reasonable controllable area of the RPP. Thus, the proposed control enables the RPP to output maximum reactive power without voltage overruns in any voltage levels, highlighting a significant security enhancement.

C. The Voltage Support Enhancement Compared With Conventional Control

To further demonstrate the voltage support enhancement of the proposed control, widely used conventional methodologies, which adhere to the latest China grid code, are compared in this section. Comparisons are made under various test conditions, where the comparison result in Case 3 is selected for detailed analysis, as shown in FIG. 7, while others are listed in Table III.

Figure 7:
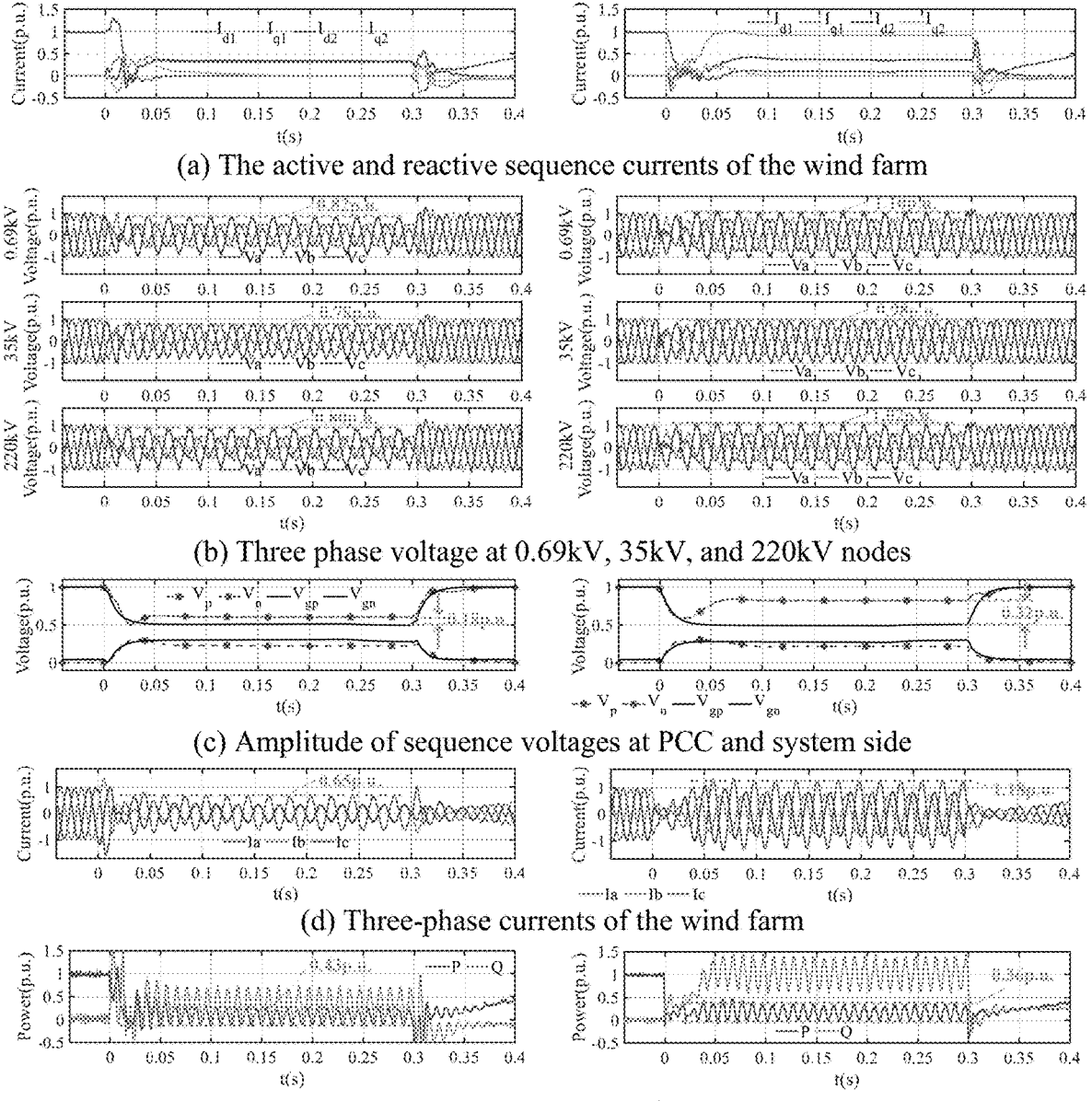
FIG. 7 shows exemplary performance of the conventional control methodology (on the charts on the left side) and exemplary performance of the described control methodology (on the charts on the right side).

FIG. 7 shows exemplary performance of the conventional control methodology (on the charts on the left side) and exemplary performance of the described control methodology (on the charts on the right side). As seen in FIG. 7, the described control has higher voltage support capability and better protection of the converter. In FIG. 7(a), the proposed control enables a better voltage support capability by outputting larger reactive current. In FIG. 7(b), the maximum three-phase voltage amplitude under the conventional control is 0.82 p.u., while it reaches 1.10 p.u. under the proposed control. The positive sequence voltage is increased 0.32 p.u. by the proposed control, as shown in FIG. 7(c), which is 78% greater than the conventional control. Besides, the active power oscillation amplitude of the wind farm under the conventional control reaches 0.43 p.u. in FIG. 7(e), exceeding the pre-defined safe threshold. As a comparison, the proposed control enables the phase current amplitude and the active oscillation amplitude below the pre-defined threshold, as evident in FIGS. 7(d) and 7(e).

More comparison results under various test conditions are concluded in Table III. The described control enables at least a 30% increment than the conventional control when the positive voltage sags to not less than 0.3 p.u.

TABLE III

POSITIVE VOLTAGE ENHANCEMENT COMPARED
TO THE CONVENTIONAL CONTROL
UNDER DIFFERENT VOLTAGE SAGS

| Percentage increase of positive voltage | | Positive voltage sags to | | | | |
|---|---|---|---|---|---|---|
| | | 0.7 p.u. | 0.6 p.u. | 0.5 p.u. | 0.4 p.u. | 0.3 p.u. |
| Negative voltage sags to | 0.1 p.u. | 66.1% | 132.7% | 111.2% | 99.2% | 33.3% |
| | 0.3 p.u. | 71.2% | 69.3% | 89.5% | 113.1% | 46.3% |
| | 0.5 p.u. | 51.6% | 62.1% | 75.6% | 96.1% | 56.9% |

Finally, to highlight the merit of the described control, a brief comparison with published literature is presented in Table IV. The main contribution of the described control is summarized as ensuring the voltage safety of the whole system while maximizing the utilization of RPP voltage support capability.

TABLE IV

OVERALL COMPARISONS WITH PUBLISHED LITERATURE

| Study in | Offer max-reactive power | Power oscillation safety | Converter overcurrent safety | System voltage safety | Flexible switch control targets |
|---|---|---|---|---|---|
| [13]-[18] | Not | Not | Not | Not | Not |
| [20], [25]-[26] | Yes | Not | Not | Not | Not |
| [27]-[30] | Yes | Yes | Yes | Safety at PCC only | Not |
| [24], [31]-[35] | Yes | Yes | Yes | Safety at PCC only | Yes |
| This paper | Yes | Yes | Yes | The entire system | Yes |

V. Conclusion

The increasing integration of inverter-interfaced RESs significantly weakened grid strength, transforming strong grids into weak ones. This shift, particularly in scenarios where the SCR of the RPP is less than 3, underscores the critical importance of system-side responses in LVRT control consideration. Existing methodologies, applicable to strong grids, fail to ensure overall system voltage safety, leading to phase voltage overruns. This study addresses this gap by introducing a system-level LVRT control strategy that incorporates system-side responses into the control framework. The proposed method utilizes a boundary model in the geometrical plane to accurately capture voltage safety margins, and calculates optimal LVRT commands using a discrete and clustering matrix-based approach. Hardware-in-loop experiments, modeling a practical wind farm connected to a weak grid with SCR=3, demonstrate the effectiveness of the proposed control. Compared to both recent research and widely adopted engineering practices, the proposed method eliminates voltage overrun risks, which is up to 14% in the existing methods, and increases reactive power support by at least 30% when voltage sags are above 0.3 p.u., significantly improving system security and performance in weak grid conditions.

Exemplary System

Figure 8:
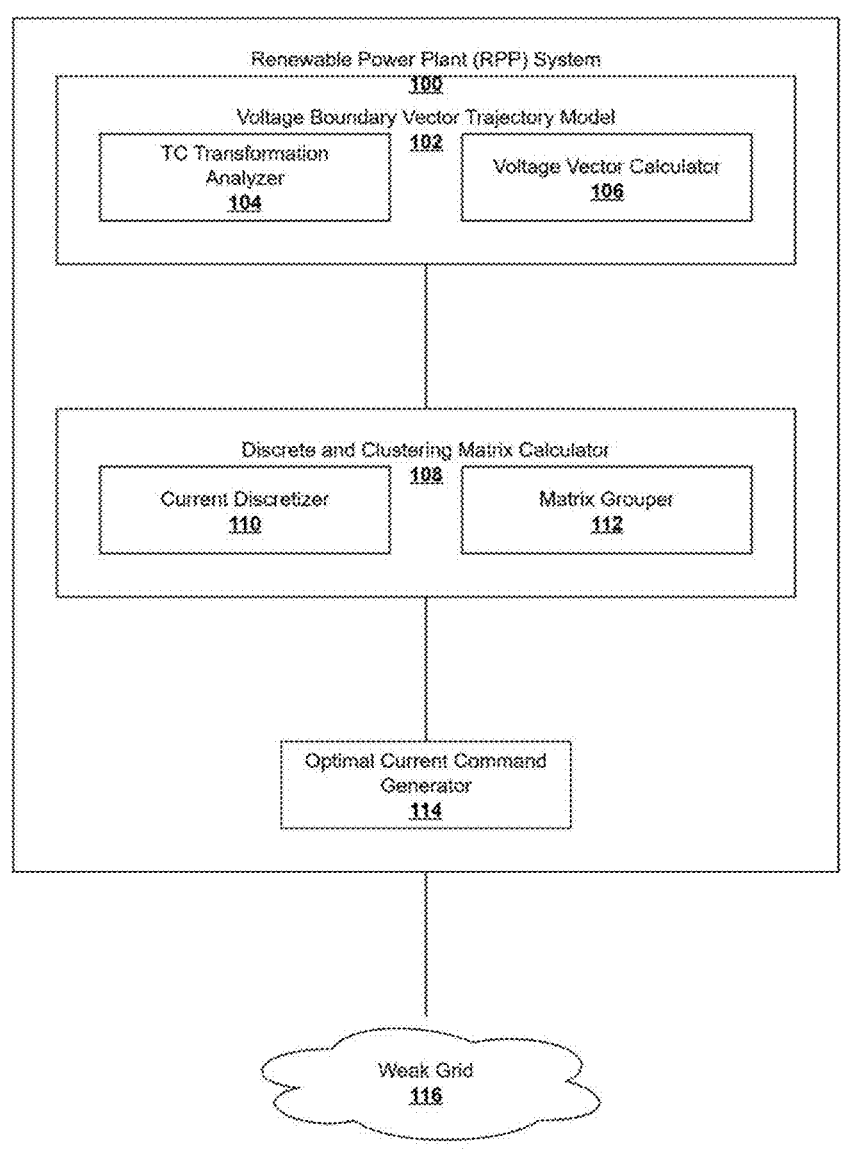
FIG. 8 shows an exemplary Renewable Power Plant (RPP) System 100 which may be configured to connect to a Weak Grid 116 through a system-level low voltage ride-through (LVRT) control architecture.

Referring to FIG. 8, a Renewable Power Plant (RPP) System 100 may be configured to connect to a Weak Grid 116 through a system-level low voltage ride-through (LVRT) control architecture. The RPP System 100 may provide enhanced voltage support capabilities during voltage disturbances while maintaining system's voltage stability. In some cases, the RPP System 100 may incorporate advanced control algorithms that address the challenges associated with weak grid connections, where traditional control methodologies may prove inadequate for maintaining voltage security throughout the entire electrical network, especially for a system with multiple voltage levels.

The Weak Grid 116 may be characterized by a short circuit ratio (SCR) of less than 3, which distinguishes weak grid conditions from stronger grid configurations. In some cases, the Weak Grid 116 may exhibit an SCR of approximately 3 during testing scenarios, representing the threshold where system-side responses become particularly influential in LVRT control processes. The reduced short circuit capacity of the Weak Grid 116 may result in insufficient fault voltage support, potentially leading to large-scale disconnection of renewable energy sources during voltage disturbances. The characteristics of the Weak Grid 116 may necessitate that renewable power plants provide adequate reactive power support capacity to maintain system stability and prevent cascading failures.

With continued reference to FIG. 8, the RPP System 100 may incorporate a multi-level voltage architecture that includes 2-4 voltage levels extending from the renewable energy unit to the high-voltage system. The multi-level configuration may utilize an n-stage step-up arrangement that progressively transforms voltage levels to match grid requirements. In some cases, the voltage levels may include configurations such as 0.69 kV (or 0.38 kV for photovoltaic sources), 35 kV, and 220 kV, with each level serving specific functions within the overall power delivery system. For high-capacity RPPs, it is necessary to configure multiple voltage levels because a large number of converters can only be connected to the grid through low voltage levels during design. After they are collected, they need to be transmitted to the outside through high voltage levels, which can reduce line current at the same power and minimize energy loss for long-distance transmission. In this configuration, the proposed control methodology will achieve better performance than traditional control methodologies.

The system-level LVRT control architecture of the RPP System 100 may address the limitations of conventional control methodologies that focus solely on point of common coupling measurements. In some cases, the architecture can infer the voltage safety impact of RPP output on other unmeasurable nodes through the measurement of common coupling measurements, that extend beyond single-point measurements to encompass the entire voltage transformation network. Usually, traditional control methods must achieve this effect under global monitoring of the system. The LVRT control system may be designed to handle asymmetrical voltage sags and other grid disturbances while ensuring voltage security across all voltage levels within the RPP System 100. As further shown in FIG. 8, the connection between the RPP System 100 and the Weak Grid 116 may represent the interface where system-level control strategies become particularly relevant for maintaining grid stability and preventing voltage overruns that could compromise system safety.

Referring to FIG. 8, the Renewable Power Plant (RPP) System 100 may incorporate a Voltage Boundary Vector Trajectory Model 102 that captures geometric relationships of system-side responses to determine voltage controllable boundaries. The Voltage Boundary Vector Trajectory Model 102 may address the complex voltage distribution characteristics that occur during asymmetrical voltage sags in weak grid environments. In some cases, the Voltage Boundary Vector Trajectory Model 102 may provide a comprehensive framework for analyzing voltage behavior across multiple transformation stages within the RPP System 100. The model may account for the sophisticated voltage distributions that arise from transformer connection transformations and their impact on system-level voltage security.

The Voltage Boundary Vector Trajectory Model 102 may include a TC Transformation Analyzer 104 that determines geometric relationships within the voltage transformation network. The TC Transformation Analyzer 104 may evaluate the impact of transformer connection configurations on voltage distribution patterns throughout the system. In some cases, the TC Transformation Analyzer 104 may determine a critical impedance $X_{CR}$ larger than 1.73 per unit for voltage distribution analysis. When the equivalent impedance of a transformer is greater than $X_{CR}$, the TC transformation of this transformer will not affect the LVRT control process of RPP, thus not needed to be analyzed by the TC Transformation Analyzer 104. The TC Transformation Analyzer 104 may process information related to phase derivation by TC transformation, represented by the parameter $\alpha$, which may be a multiple of 300 depending on the specific transformer connection type employed within the system.

With continued reference to FIG. 8, the Voltage Boundary Vector Trajectory Model 102 may also incorporate a Voltage Vector Calculator 106 that performs phase jump calculations and voltage boundary determinations. The Voltage Vector Calculator 106 may utilize phase jump calculations where a represents the phase derivation that occurs during transformer connection transformations. In some cases, the Voltage Vector Calculator 106 may process positive and negative sequence voltage components, designated as $V_g^+$ and $V_g^-$ respectively, along with positive and negative sequence reactive current components, designated as $I_Q^+$ and $I_Q^-$ respectively. The Voltage Vector Calculator 106 may also incorporate the equivalent inductance between the point of common coupling and grid side, represented by the parameter $X_\Sigma$, and the phase difference between positive and negative voltage components, represented by the parameter $\gamma$.

The Voltage Boundary Vector Trajectory Model 102 may account for transformer connection transformations by selecting six amplitude-equal voltage vectors spaced 60° apart with reference to a phase of RPP control coordinate system. In some cases, the six voltage vectors may be positioned to inscribe the voltage controllable boundary in a manner that captures the geometric relationships of the voltage distribution network. The spacing of 60° between adjacent vectors may correspond to the geometric constraints imposed by transformer connection transformations and the resulting voltage phase relationships. The amplitude-equal characteristic of the voltage vectors may provide a uniform representation of voltage boundary conditions across different angular positions within the control coordinate system.

As further shown in FIG. 8, the voltage controllable boundary equation may be expressed as $$V_{max} = \sqrt{\left(V_g^+ + X_\Sigma I_Q^+\right)^2 + \left(V_g^- + X_\Sigma I_Q^-\right)^2 + 2\left(V_g^+ + X_\Sigma I_Q^+\right)\left(V_g^- + X_\Sigma I_Q^-\right)\cos(\gamma + \alpha)},$$

where the equation incorporates the various system parameters processed by the TC Transformation Analyzer 104 and Voltage Vector Calculator 106. The equation may represent the maximum voltage amplitude that can occur at any point within the voltage transformation network under given operating conditions. In some cases, the cosine term within the equation may capture the phase relationships between positive and negative sequence components as modified by transformer connection transformations. The voltage controllable boundary equation may provide the mathematical foundation for determining safe operating limits and preventing voltage overruns throughout the multi-level voltage transformation system of the RPP System 100.

Referring to FIG. 8, the Renewable Power Plant (RPP) System 100 may incorporate a Discrete and Clustering Matrix Calculator 108 that computes optimal current commands within the constructed voltage controllable boundaries determined by the Voltage Boundary Vector Trajectory Model 102. The Discrete and Clustering Matrix Calculator 108 may implement a discrete and clustering matrix-based calculation algorithm that processes current information through systematic discretization and matrix organization methodologies. In some cases, the Discrete and Clustering Matrix Calculator 108 may receive input data from the Voltage Boundary Vector Trajectory Model 102 and transform this information into structured matrix formats suitable for optimal command generation. The calculator may provide computational efficiency while maintaining accuracy in determining current commands that satisfy multiple boundary constraints simultaneously within the RPP System 100.

The Discrete and Clustering Matrix Calculator 108 may include a Current Discretizer 110 that performs systematic discretization of positive sequence reactive current components. The Current Discretizer 110 may discretize positive sequence reactive current $I_Q^+$ to an m-dimensional vector where m denotes discrete resolution taken as 50-100. In some cases, the discrete resolution range of 50-100 may provide sufficient granularity for accurate current command calculations while maintaining computational feasibility within real-time control applications. The Current Discretizer 110 may transform continuous current variables into discrete vector representations that facilitate matrix-based processing and optimization algorithms. The m-dimensional vector output from the Current Discretizer 110 may serve as input for subsequent matrix clustering operations within the Discrete and Clustering Matrix Calculator 108.

With continued reference to FIG. 8, the Discrete and Clustering Matrix Calculator 108 may also incorporate a Matrix Grouper 112 that organizes solution vectors according to predetermined clustering criteria. The Matrix Grouper 112 may receive vectors derived from boundary equation solutions and systematically group these vectors based on their mathematical properties. In some cases, the Matrix Grouper 112 may process ten vectors obtained from boundary equations that relate to negative sequence reactive current $I_Q^-$ calculations. The clustering methodology implemented by the Matrix Grouper 112 may facilitate efficient identification of optimal current commands by organizing solution vectors into manageable matrix structures that support parallel processing and comparison operations.

The discrete and clustering matrix-based calculation algorithm implemented by the Discrete and Clustering Matrix Calculator 108 may substitute discretized $I_Q^+$ values into voltage, active power oscillation, and phase current boundary equations to solve for vectors about negative sequence reactive current $I_Q^-$. In some cases, the algorithm may process each discretized value through multiple boundary constraint equations simultaneously, generating solution vectors that satisfy different operational limitations within the RPP System 100. The substitution process may yield multiple solution vectors for each discretized current value, with each vector representing a potential operating point that satisfies specific boundary conditions. The algorithm may evaluate these solution vectors to identify feasible operating regions and determine optimal current commands that maximize system performance while maintaining safety constraints across all voltage levels within the multi-stage transformation network.

As further shown in FIG. 8, the Matrix Grouper 112 may cluster the ten vectors from boundary equations into upper matrix $B_{up}$ and lower matrix $B_{down}$ according to norm of each solution vector. The clustering methodology may evaluate the magnitude of each solution vector and assign vectors with larger norms to the upper matrix $B_{up}$ while assigning vectors with smaller norms to the lower matrix $B_{down}$. In some cases, the norm-based clustering approach may facilitate identification of boundary conditions by separating solution vectors according to their relative magnitudes within the solution space. The upper matrix $B_{up}$ and lower matrix $B_{down}$ may provide structured representations of the feasible operating region boundaries, enabling efficient computation of maximum and minimum allowable current values for optimal command generation within the RPP System 100.

Referring to FIG. 8, the Renewable Power Plant (RPP) System 100 may incorporate an Optimal Current Command Generator 114 that computes optimal current commands within the constructed boundaries established by the Voltage Boundary Vector Trajectory Model 102 and processed by the Discrete and Clustering Matrix Calculator 108. The Optimal Current Command Generator 114 may receive structured matrix data from the Matrix Grouper 112 and transform this information into specific current command values that maximize voltage support capability while maintaining system safety constraints. In some cases, the Optimal Current Command Generator 114 may implement a hierarchical control strategy that addresses multiple operational objectives through a systematic priority sequence. The generator may process the upper matrix $B_{up}$ and lower matrix $B_{down}$ to identify feasible operating regions and determine current commands that optimize system performance during various grid disturbance conditions.

The Optimal Current Command Generator 114 may implement a power priority sequence that systematically addresses different current components according to their relative importance for voltage support and system stability. The generator may prioritize positive reactive power as the primary control objective, recognizing that positive sequence reactive current injection provides the most direct voltage support capability during asymmetrical voltage sags. In some cases, the positive reactive power priority may reflect the fundamental requirement for voltage magnitude support at the point of common coupling and throughout the multi-level voltage transformation network. The Optimal Current Command Generator 114 may allocate available current capacity to positive sequence reactive current $I_Q^+$ before considering other current components, thereby ensuring that voltage support capability receives precedence over alternative control objectives within the RPP System 100.

With continued reference to FIG. 8, the Optimal Current Command Generator 114 may utilize remaining capacity for negative reactive power after satisfying positive reactive power requirements. The generator may evaluate the residual current capacity following positive sequence reactive current allocation and determine appropriate negative sequence reactive current $I_Q^-$ commands that address voltage unbalance conditions. In some cases, injecting too much positive sequence reactive power may cause the healthy phase voltage to exceed the limit, and a certain amount of negative reactive power needs to be injected to reduce the imbalance of the three-phase voltage. The Optimal Current Command Generator 114 may calculate negative sequence reactive current commands based on the available capacity margins determined through the discrete and clustering matrix-based calculations performed by the Discrete and Clustering Matrix Calculator 108. The secondary priority assigned to negative reactive power may reflect the complementary nature of voltage balancing relative to the primary voltage magnitude support objective.

The Optimal Current Command Generator 114 may allocate remaining capacity for active power during asymmetrical voltage sags after addressing both positive and negative reactive power requirements. The generator may determine active power commands that utilize any residual current capacity following reactive power allocations, thereby maintaining power delivery capability while respecting current amplitude limitations. In some cases, the active power allocation may involve both positive and negative sequence active current components, with the generator calculating appropriate command values that maximize power transfer within the available capacity constraints. The Optimal Current Command Generator 114 may set negative sequence active current commands to zero in certain operating scenarios to simplify control implementation and focus available capacity on reactive power support functions. The tertiary priority assigned to active power may ensure that voltage support objectives receive precedence while maintaining power delivery capability within the constraints established by the voltage controllable boundaries and current amplitude limitations.

As further shown in FIG. 8, the Optimal Current Command Generator 114 may ensure voltage safety across the entire system while maximizing utilization of RPP voltage support capability through comprehensive boundary constraint evaluation. The generator may process voltage boundary information from the Voltage Boundary Vector Trajectory Model 102 to verify that computed current commands maintain voltage amplitudes within acceptable limits at all voltage levels throughout the multi-stage transformation network. In some cases, the Optimal Current Command Generator 114 may incorporate active power oscillation boundaries and phase current boundaries alongside voltage boundaries to provide comprehensive constraint satisfaction. The generator may compare calculated current commands against multiple boundary conditions simultaneously, ensuring that the selected commands satisfy all operational limitations while maximizing the reactive power injection capability of the RPP System 100. The comprehensive constraint evaluation performed by the Optimal Current Command Generator 114 may prevent voltage overruns and current amplitude violations that could compromise system safety or equipment protection within the renewable power plant and its connection to the Weak Grid 116.

Exemplary Method

A method for system-level low voltage ride-through control of a renewable power plant connected to a weak grid, can comprise:

determining voltage controllable boundaries by capturing geometric relationships of system-side responses using a voltage boundary vector trajectory model that accounts for transformer connection transformations, wherein voltage controllable boundaries are determined using:

$$V_{lim}^2 = \left(X_\Sigma I_Q^+ + A_U\right)^2 + \left(-X_\Sigma I_Q^- + V_g^-\right)^2 \tag{12}$$

$$+ 2\left(X_\Sigma I_Q^+ + A_U\right)\left(-X_\Sigma I_Q^- + V_g^-\right)\cos\left(\gamma_{PCC} + \Delta\gamma - \frac{k\pi}{3}\right)$$

$$A_U = \sqrt{V_g^{+2} - (X_\Sigma I_P^+)^2}, \; \Delta\gamma = X_\Sigma\left(I_P^+ - I_{P,|0|}^+\right) / V_g^+$$

$$k = 0, 1, 2, 3, 4, 5$$

wherein the $X_\Sigma$, $V_g^+$ and $V_g^-$ is measured by an online impedance estimator;

discretizing positive sequence reactive current $I_Q^+$ to an m-dimensional vector where m denotes discrete resolution, and wherein:

$$I_{Q.des}^+ = \left[0 : \sqrt{I_{lim}^2 - I_P^{+2}} \; / \; m : \sqrt{I_{lim}^2 - I_P^{+2}}\right] \tag{16}$$

where m denotes discrete resolution;

substituting the discretized $I_{Q.des}^+$ into voltage boundary equations to solve for vectors about negative sequence reactive current $I_Q^-$;

grouping the solved vectors into two matrices $B_{up}$ and $B_{down}$ according to norm of each solution vector, wherein:

$$\begin{cases} B_{up} = \begin{bmatrix} I_{Q.des\,1.1.1}^- & L & I_{Q.des\,1.1.k}^- \\ M & O & M \\ I_{Q.des\,1.m.1}^- & L & I_{Q.des\,1.m.k}^- \end{bmatrix} \\ B_{down} = \begin{bmatrix} I_{Q.des\,2.1.1}^- & L & I_{Q.des\,2.1.k}^- \\ M & O & M \\ I_{Q.des\,2.m.1}^- & L & I_{Q.des\,2.m.k}^- \end{bmatrix} \end{cases} \tag{17}$$

where $$I_{Q.des1.m.k}^-$$

and $$I_{Q.des2.m.k}^-$$

denote the two solutions obtained from the k-th equation at the m-th discrete point;

calculating a maximum value of each row of the $B_{up}$ and a minimum value of each row of the $B_{down}$ and combine them into $I_{up}$ and $I_{down}$ respectively, such that:

$$I_{up.i} \leq I_{down.i} \tag{18}$$

computing optimal current commands within the voltage controllable boundaries using the grouped matrices;

transmitting the optimal current commands to all units within the renewable power plant, including wind turbines, photovoltaics, and static var generators;

at a grid-connected inverter for each unit, mathematically transforming an optimal current command issued to the unit to obtain a switching signal of the thyristor; and controlling the output three-phase current of the unit using the switching signal.

In an example embedment, a practical application of the present disclosure was applied at an actual wind farm in Xinjiang, China, featuring the short-circuit ratio (SCR) of 3 and the rated capacity of 247.5MW. The system includes three voltage levels, 0.69 kV, 35 kV, and 220 kV, with TCs in Dyn11 and YNd11 configurations, respectively. Without the teachings of the present disclosure, a B-phase ground fault (BG fault) occurs in the system, requiring the wind farm to enter low-voltage ride-through control mode. Under the methodology introduced in the present disclosure, the controller of the wind farm collected fault status information and calculated the optimal LVRT current commands for each wind turbine. The grid-connected converter of each wind turbine generates three-phase current according to the issued commands to support the system voltage, raising the positive sequence voltage at the common coupling point by 0.32 pu. In contrast, existing control methodologies can only raise the positive sequence voltage at the common coupling point by 0.18 pu. Using the teachings of the present disclosure, the voltage support capability of the wind farm is increased by 78%, which greatly improves the voltage stability of weak grids.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

APPENDIX

TABLE A1

EXPERIMENTAL PARAMETERS OF THE RPP
AND ITS HARDWARE CONTROLLER

| Element | Parameters | Value |
|---|---|---|
| Type-IV | Single turbine capacity | 3.3 MW |
| Wind farm | Rated AC voltage/frequency | 0.69 kV/50 Hz |
| | Voltage/capacitance of DC bus | 1.2 kV/35000 uF |
| | Parameters of LCL filter | 0.12 mH/0.06 mH/ 500 uF/0.122 Ω |

TABLE A1-continued

EXPERIMENTAL PARAMETERS OF THE RPP
AND ITS HARDWARE CONTROLLER

| Element | Parameters | Value |
|---|---|---|
| | PI constant of current loop | 1.5 p.u./0.02 p.u. |
| | PI constant of phase locked loop | 30 p.u./0.005 p.u. |
| | Gain of notch filter | 1 p.u. |
| | Feature frequency of notch filter | 100 Hz |
| | Damping ratio of notch filter | 0.1 p.u. |
| | Sampling frequency | 20 kHz |
| Hardware | Central Processing Unit (CPU) | ARM Cortex-A9 |
| controller | Field programmable gate array (FPGA) | 28 nm Artix-7 |
| | Xilinx Board | Xilinx Zynq 7035 |
| | Rated capacity | 500 MW |
| Station | Ratio | 35/220 kV |
| transformer | Connection mode | YNd11 |
| | Short-circuit impedance | 6% |
| | Rated capacity | 5 MW |
| Turbine | Ratio | 0.69/35 kV |
| transformer | Connection mode | Dyn11 |
| | Short-circuit impedance | 10% |
| Transmission Line 220 kV | Length | 170.5 km |
| | Impedance (R/X) | 0.067/0.416 Ω/ km |
| Transmission Line 35 kV | Length | 6.43 km |
| | Impedance (R/X) | 0.132/0.358 Ω/km |
| Utility grid | Voltage level | 220 kV |
| | SCR | 3.0 |

Nomenclature

LVRT Low-voltage ride-through
TC Transformer connection
RES Renewable energy source
RPP Renewable power plant
PCC Point of common coupling
SCR Short circuit ratio
p.u. Per unit
RTDS The real-time digital simulator $U_i^+, U_i^-$ he voltage vector at the i-th node $V_i^+, V_i^-$ The voltage amplitude at the i-th node $I_P^+, I_P^-, I_Q^+,$ The positive/negative and
$I_Q^-$ active/reactive current components of the RPP
$\delta^+, \delta^-$ The phase of positive and negative voltage components with reference to the αβ-axis.
$\gamma$ The difference between $\delta^+$ and $\delta^-$
$\varphi$ The voltage phase and is taken as 0, $\frac{2}{3}\pi$ and $-\frac{2}{3}\pi$, respectively
Z, X, T The impedance, reactance and transformer
$\alpha$ The phase derivation by TC transformation
$\Delta V_{i-j-\varphi}$ The difference of phase voltage amplitude between the i-th and j-th nodes.
$X_{CR}$ The critical impedance of TC transformation

$V_{lim}$, The maximum permissible phase
$\hat{P}_{lim}, I_{lim}$ voltage, active oscillation and phase current
$X_\Sigma$ The equivalent inductance between the PCC and the grid side
$I_{P.|0|}{}^+$ The positive-active current component of the RPP before the asymmetrical voltage sag

REFERENCES

[1] P. Mishra, A. K. Pradhan and P. Bajpai, "Adaptive Distance Relaying for Distribution Lines Connecting Inverter-Interfaced Solar PV Plant," in IEEE Transactions on Industrial Electronics, vol. 68, no. 3, pp. 2300-2309, March 2021, doi: 10.1109/TIE.2020.2975462.

[2] M. Wei, D. Lu, T. Wu and H. Hu, "Maximum Reactive Power Generation Method Based on Limitation of Output Capacity for Star-Connected Cascaded H-Bridge STATCOM Under Voltage Sag," in IEEE Transactions on Industrial Electronics, vol. 71, no. 1, pp. 635-645, January 2024, doi: 10.1109/TIE.2023.3245182.

[3] Q. Liu, K. Jia, B. Yang, L. Zheng and T. Bi, "Fault Analysis of Inverter-Interfaced RESs Considering Decoupled Sequence Control," in IEEE Transactions on Industrial Electronics, vol. 70, no. 5, pp. 4820-4830, May 2023, doi: 10.1109/TIE.2022.3181382.

[4] Y. Zhang et al., "Multistage Parameter Identification for Fault Control Parameters of the IIES," in IEEE Transactions on Power Electronics, vol. 38, no. 11, pp. 14590-14600, November 2023, doi: 10.1109/TPEL.2023.3298064.

[5] Z. Li, K. W. Chan, J. Hu and S. W. Or, "An Adaptive Fault Ride-Through Scheme for Grid-Forming Inverters Under Asymmetrical Grid Faults," in IEEE Transactions on Industrial Electronics, vol. 69, no. 12, pp. 12912-12923, December 2022, doi: 10.1109/TIE.2021.3135641.

[6] T. Bi, B. Yang, K. Jia, L. Zheng, Q. Liu and Q. Yang, "Review on Renewable Energy Source Fault Characteristics Analysis," in CSEE Journal of Power and Energy Systems, vol. 8, no. 4, pp. 963-972, July 2022, doi: 10.17775/CSEEJPES.2021.06890.

[7] Australian Energy Market Operator. Preliminary report-black system event in South Australia on 28 Sep. 2016 [R]. https://www.aemo.com.au/search#mainsearch_e=0&mainsearch_q=black %20system %20event %20in %20South %20Australia %20on %2028%20September %202016.

[8] Operador Nacional do Sistema Elétrico. ONS Apresenta Análises Preliminares da ocorréncia do dia 15.08.2023 aos agentes participantes da primeira reuni á o do RAP [EB/OL]. Brazil, Rio de Janeiro: ONS, 2023. https://www.ons.org.br/Paginas/Noticias/20230825-ONSapresenta-an%C3%A1lises-preliminares-da-ocorr%C3%AAncia-do-dia-15-08-2023-aos-agentes-participantes-da-primeira-reuni%C3% A3o-.aspx.

[9] E.ON Netz. Grid Code, "Grid code: high and extra high voltage," E.ON Netz GmbH, Bayreuth, Germany, Aprril 2006. https://www.eon.com/en.html.

[10] WECC-0060—PRC-024-WECC-1-CR—Generator Low-Voltage Ride-Through Criterion—Regional Criterion. https://www.wecc.org/program-areas/registration-and-certification/entity-registration.

[11] "Grid code—version 3.0.," ESB National Grid, Ireland, September 2007. https://www.nsai.ie/standards/sectors/electrotechnical-standards.

[12] The grid code, issue 3, rev. 24," National Grid Electricity Transmission plc, U.K., October 2008. https://www.gov.uk/guidance/electricity-network-delivery-and-access.

[13] K. Sharifabadi, L. Harnefors, H. Nee, S. Norrga, and R. Teodorescu, Design, Control, and Application of Modular Multilevel Converters for HVDC Transmission Systems. Hoboken, NJ, USA: Wiley, 2016.

[14] F. Wang, J. L. Duarte and M. A. M. Hendrix, "Pliant Active and Reactive Power Control for Grid-Interactive Converters Under Unbalanced Voltage Dips," in IEEE Transactions on Power Electronics, vol. 26, no. 5, pp. 1511-1521, May 2011, doi: 10.1109/TPEL.2010.2052289.

[15] A. Camacho, M. Castilla, J. Miret, J. C. Vasquez and E. Alarcon-Gallo, "Flexible Voltage Support Control for Three-Phase Distributed Generation Inverters Under Grid Fault," in IEEE Transactions on Industrial Electronics, vol. 60, no. 4, pp. 1429-1441, April 2013, doi: 10.1109/TIE.2012.2185016.

[16] R. Kabiri, D. G. Holmes and B. P. McGrath, "Control of Active and Reactive Power Ripple to Mitigate Unbalanced Grid Voltages," in IEEE Transactions on Industry Applications, vol. 52, no. 2, pp. 1660-1668, March-April 2016, doi: 10.1109/TIA.2015.2508425.

[17] State Administration for Market Regulation, Standardization Administration. GB/T 37408-2019 Technical requirements for photovoltaic grid connected inverter[S]. Beijing: Standards Press of China, 2019. http://c.gb688.cn/bzgk/gb/showGb?type=online&hcno=F0127C2B431AC283CD6ED17CE67F8E46.

[18] State Administration for Market Regulation, Standardization Administration. GB/T 19963.1-2021, Technical Regulations for Connecting Wind Farms to Power Systems—Part 1: onshore wind power[S]. Beijing: Standards Press of China, 2019. http://c.gb688.cn/bzgk/gb/showGb?type=online&hcno=40D8691DFD7EC3CBA423CCBA65D262F3.

[19] M. M. Shabestary and Y. A.-R. L. Mohamed, "Asymmetrical Ride-Through and Grid Support in Converter-Interfaced DG Units Under Unbalanced Conditions," in IEEE Transactions on Industrial Electronics, vol. 66, no. 2, pp. 1130-1141, February 2019, doi: 10.1109/TIE.2018.2835371.

[20] M. Islam, M. Nadarajah and M. J. Hossain, "A Grid-Support Strategy With PV Units to Boost Short-Term Voltage Stability Under Asymmetrical Faults," in IEEE Transactions on Power Systems, vol. 35, no. 2, pp. 1120-1131, March 2020, doi: 10.1109/TPWRS.2019.2942094.

[21] M. Islam, M. Nadarajah and M. J. Hossain, "A Grid-Support Strategy With PV Units to Boost Short-Term Voltage Stability Under Asymmetrical Faults," in IEEE Transactions on Power Systems, vol. 35, no. 2, pp. 1120-1131, March 2020, doi: 10.1109/TPWRS.2019.2942094.

[22] Z. Li, K. W. Chan, J. Hu and S. W. Or, "An Adaptive Fault Ride-Through Scheme for Grid-Forming Inverters Under Asymmetrical Grid Faults," in IEEE Transactions on Industrial Electronics, vol. 69, no. 12, pp. 12912-12923, December 2022, doi: 10.1109/TIE.2021.3135641.

[23] Á. Borrell, M. Velasco, A. Camacho, J. Miret and M. Castilla, "Remote Negative-Sequence Voltage Fair Compensation in Grid-Forming Inverter-Based Islanded AC Microgrids," in IEEE Transactions on Power Electronics, vol. 38, no. 10, pp. 12570-12582, October 2023, doi: 10.1109/TPEL.2023.3298835.

[24] L. Ji et al., "A Multi-Objective Control Strategy for Three Phase Grid-Connected Inverter During Unbalanced Voltage Sag," in IEEE Transactions on Power Delivery, vol. 36, no. 4, pp. 2490-2500, August 2021, doi: 10.1109/TPWRD.2020.3025158.

[25] A. Camacho, M. Castilla, J. Miret, L. G. de Vicuna and R. Guzman, "Positive and Negative Sequence Control Strategies to Maximize the Voltage Support in Resistive-Inductive Grids During Grid Faults," in IEEE Transactions on Power Electronics, vol. 33, no. 6, pp. 5362-5373, June 2018, doi: 10.1109/TPEL.2017.2732452.

[26] S. Hasan and V. Agarwal, "An Unconstrained Voltage Support Scheme for Distributed Generation Connected to Resistive-Inductive Grid under Unbalanced Conditions," 2019 IEEE Industry Applications Society Annual Meeting, Baltimore, MD, USA, 2019, pp. 1-6, doi: 10.1109/IAS.2019.8912351.

[27] A. Camacho, M. Castilla, J. Miret, L. G. de Vicuna and G. L. Miguel Andrés, "Control Strategy for Distribution Generation Inverters to Maximize the Voltage Support in the Lowest Phase During Voltage Sags," in IEEE Transactions on Industrial Electronics, vol. 65, no. 3, pp. 2346-2355, March 2018, doi: 10.1109/TIE.2017.2736486.

[28] A. Camacho, M. Castilla, J. Miret, A. Borrell and L. G. de Vicuna, "Active and Reactive Power Strategies With Peak Current Limitation for Distributed Generation Inverters During Unbalanced Grid Faults," in IEEE Transactions on Industrial Electronics, vol. 62, no. 3, pp. 1515-1525, March 2015, doi: 10.1109/TIE.2014.2347266.

[29] M. M. Shabestary and Y. A.-R. I. Mohamed, "An Analytical Method to Obtain Maximum Allowable Grid Support by Using Grid-Connected Converters," in IEEE Transactions on Sustainable Energy, vol. 7, no. 4, pp. 1558-1571, October 2016, doi: 10.1109/TSTE.2016.2569022.

[30] S. R. Mohapatra and V. Agarwal, "An Advanced Voltage Support Scheme Considering the Impact of Zero-Sequence Voltage Under Microgrid Faults Using Model Predictive Control," in IEEE Transactions on Industrial Electronics, vol. 67, no. 10, pp. 8957-8968, October 2020, doi: 10.1109/TIE.2020.2972459.

[31] M. Garnica, L. G. de Vicuña, J. Miret, M. Castilla and R. Guzmán, "Optimal Voltage-Support Control for Distributed Generation Inverters in RL Grid-Faulty Networks," in IEEE Transactions on Industrial Electronics, vol. 67, no. 10, pp. 8405-8415, October 2020, doi: 10.1109/TIE.2019.2949544.

What is claimed is:

1. A method for system-level low voltage ride-through control of a renewable power plant connected to a weak grid and including a plurality of units, the method comprising:

determining voltage controllable boundaries by capturing geometric relationships of system-side responses using a voltage boundary vector trajectory model that accounts for transformer connection transformations, wherein voltage controllable boundaries are determined using:

$$V_{lim}^2 = \left(X_\Sigma I_Q^+ + A_U\right)^2 + \left(-X_\Sigma I_Q^- + V_g^-\right)^2$$

-continued $$+2\left(X_\Sigma I_Q^+ + A_U\right)\left(-X_\Sigma I_Q^- + V_g^-\right)\cos\left(\gamma_{PCC} + \Delta\gamma - \frac{k\pi}{3}\right)$$

$$A_U = \sqrt{V_g^{+2} - (X_\Sigma I_P^+)^2}, \ \Delta\gamma = X_\Sigma\left(I_P^+ - I_{P,|0|}^+\right)/V_g^+$$

$$k = 0, 1, 2, 3, 4, 5$$

wherein the $X_\Sigma$, $V_g^+$ and $V_g^-$ is measured by an online impedance estimator;

discretizing positive sequence reactive current $I_Q^+$ to an m-dimensional vector where m denotes discrete resolution, and wherein:

$$I_{Q.des}^+ = \left[0 : \sqrt{I_{lim}^2 - I_P^{+2}} \ \middle/ \ m : \sqrt{I_{lim}^2 - I_P^{+2}}\right] \qquad (16)$$

where m denotes discrete resolution;

substituting the discretized $I_{Q.des}^+$ into voltage boundary equations to solve for vectors about negative sequence reactive current $I_Q^-$;

grouping the solved vectors into two matrices $B_{up}$ and $B_{down}$ according to norm of each solution vector, wherein:

$$\begin{cases} B_{up} = \begin{bmatrix} I_{Q.des\,1.1.1}^- & L & I_{Q.des\,1.1.k}^- \\ M & O & M \\ I_{Q.des\,1.m.1}^- & L & I_{Q.des\,1.m.k}^- \end{bmatrix} \\ B_{down} = \begin{bmatrix} I_{Q.des\,2.1.1}^- & L & I_{Q.des\,2.1.k}^- \\ M & O & M \\ I_{Q.des\,2.m.1}^- & L & I_{Q.des\,2.m.k}^- \end{bmatrix} \end{cases}$$

where:

$$I_{Q.des1.m.k}^-$$

and $$I_{Q.des2.m.k}^-$$

denote the two solutions obtained from the k-th equation at the m-th discrete point; and M, L, and O are placeholders, indicating values of $$I_{Q.=des1.m.k}$$

and $$I_{Q.=des2.m.k}$$

across rows and columns;

calculating a maximum value of each row of the $B_{up}$ and a minimum value of each row of the $B_{down}$ and combine them into $I_{up}$ and $I_{down}$ respectively, such that:

$$I_{up.i} \leq I_{down.i}$$

computing optimal current commands within the voltage controllable boundaries using the grouped matrices;

transmitting the optimal current commands to all units within the renewable power plant, wherein the units include wind turbines, photovoltaics, and static var generators;

at a grid-connected inverter for each unit, mathematically transforming an optimal current command issued to the unit to obtain a switching signal of a thyristor; and controlling the output three-phase current of the unit using the switching signal calculated from the optimal current command issued to the unit.

\* \* \* \* \*